Aug. 3, 1943. P. GLOUTON 2,325,767
MICROMETER GAUGE
Filed April 9, 1941
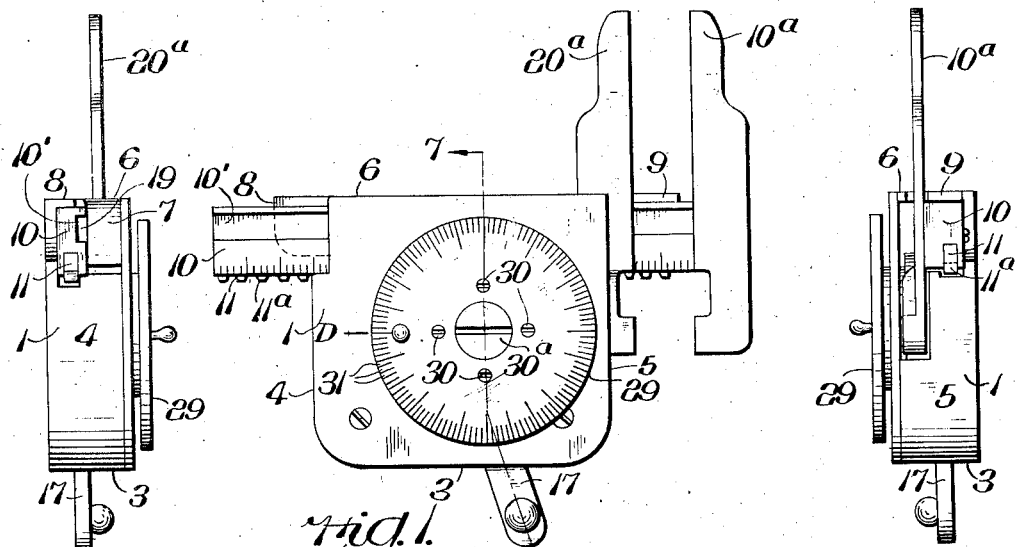
Fig. 1.
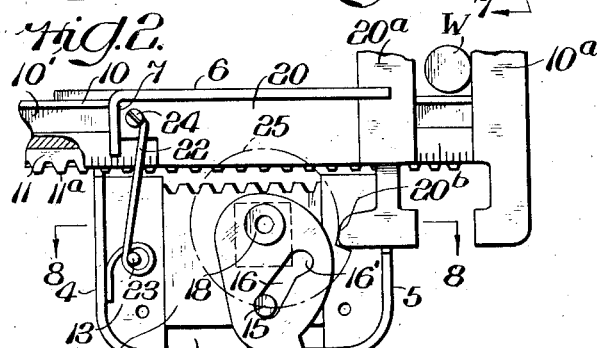
Fig. 2.
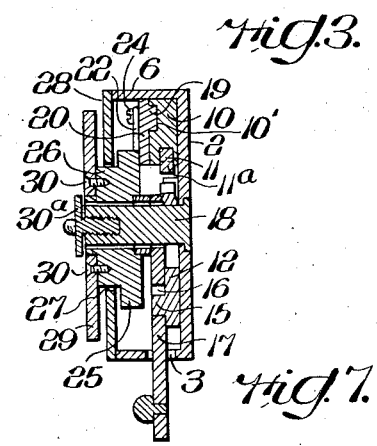
Fig. 3.
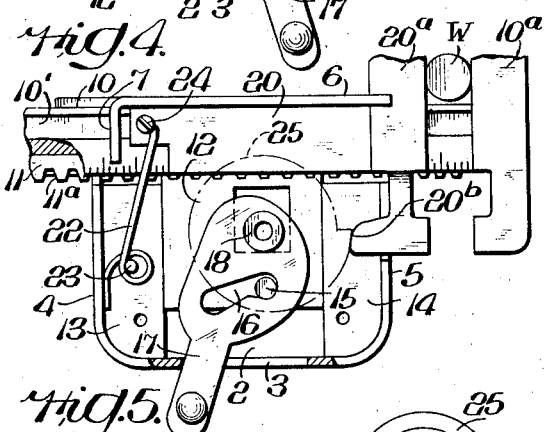
Fig. 4.
Fig. 5.
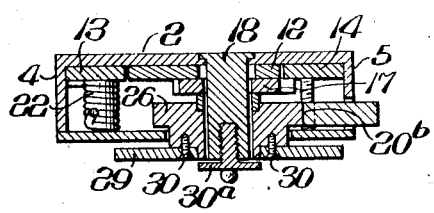
Fig. 7.
Fig. 8.
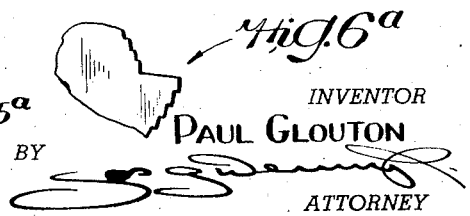
Fig. 6.
Fig. 6ᵃ
INVENTOR
PAUL GLOUTON
BY
ATTORNEY Patented Aug. 3, 1943

2,325,767

UNITED STATES PATENT OFFICE 2,325,767

MICROMETER GAUGE

Paul Glouton, Philadelphia, Pa.

Application April 9, 1941, Serial No. 387,641

5 Claims. (Cl. 33—147)

My invention is an improved micrometer gauge embodying certain of the principles of the invention of my Letters Patent No. 2,104,194 but having a more simplified structure which may be more economically manufactured and which may be more easily and accurately manipulated.

A leading object of my present invention is the provision of a micrometer gauge in which the final adjustment for measuring is made through elements which are small, light and close to the hand by which the manipulation is effected so that a very sensitive adjustment may be easily made by rotating a dial with the thumb.

A further object of my invention is to provide a gauge in which the movable caliper element by which the final adjustment is made is on the "near side" of the work; that is, nearer than the work to the hand of the manipulator so that the movement of the caliper element and the gradations of a scale over which it moves may be more readily observed.

Further objects of my invention are the provision of a light-weight and accurate gauge from few and simple parts of rugged construction which require no excessively small tolerances in their own dimensions, and most or all of which may be economically stamped from sheet metal or cut on a lathe.

My improved gauge comprises a pair of caliper elements each having a rod connected therewith: one of the rods being rectilineally movable along the other by means of a cam mounted on a carriage which may be secured in any desired position along the last named rod. Preferably the carriage-securing means includes a cam-lever rotatable on an axis on which the rod-operating cam rotates, and such cam lever actuates a rod-clamping slide movable transversely to the direction of movement of the caliper rods.

In the preferred embodiment of my improved gauge, a sheet metal housing has a base and slotted rim forming a slideway for a relatively long bar protruding from both sides of the housing and having a caliper element connected with an end thereof. A short bar slides on the long bar within the housing and has connected therewith a caliper element movable thereby between the housing and the caliper on the long bar: the latter preferably being toothed and calibrated with a scale which is partly covered by the movements of the short bar caliper element.

The housing may be locked at any desired position along the long bar by means of a toothed slide reciprocable by a cam-lever fulcrumed on a stud in the housing, and the scale exposed on the projecting long bar indicates the distance between the caliper element thereon and the datum position of the other caliper element. The housing forms a carriage for a cam rotatable on the above mentioned stud and such cam is rotatable through an external dial to shift the short bar rectilineally against the pressure of a spring and move the caliper element on the short bar toward the caliper element on the long bar. The cam is shaped and the dial is calibrated complementary to the tooth-spacing and scale on the long bar, so that a given movement of the dial effects and indicates a movement of the cam-operated caliper element equal to a given fraction of a unit of movement and measure on the long rod.

The characteristic features and advantages of my improvements will further appear from the following description and the accompanying drawing in illustration thereof.

In the drawing, Fig. 1 is a front elevation of a micrometer gauge embodying my invention; Figs. 2 and 3 are end views thereof taken from the opposite ends of Fig. 1; Figs. 4 and 5 are fragmentary views showing different positions of internal mechanism of the gauge shown in Fig. 1 with the face plate of the housing and other parts removed; Fig. 6 is a detached plan view of a cam for moving a caliper element; Fig. 6a is a greatly enlarged fragmentary view of a portion of a modified periphery for the cam shown in Fig. 6; Fig. 7 is a transverse sectional view taken on the line 7—7 of Fig. 1; and Fig. 8 is a transverse sectional view taken on the lines 8—8 of Fig. 4.

As illustrated in the embodiment of my invention shown in the drawing, certain of the operating parts of the gauge may be enclosed in a housing 1 formed from a sheet metal stamping bent to form a base 2 and a rim comprising a slotted bottom wall 3, end walls 4 and 5, and a recessed top wall 6 having a downturned lip 7. Portions of the stamping between the upper edges of the end walls 4 and 5 and the top wall 6 form lateral projections or ears 8 and 9 which form with the base 2 an extended slideway for a graduated caliper bar 10 which is movable thereon through the openings in the housing rim formed by the spaces between the top 6 and ends 4 and 5.

The bar 10 has a channeled edge in which is secured a rack 11 having tapered teeth 11a with centers uniformly spaced a desired unit of measure, or a decimal portion thereof, such as .1 inch or 1 millimeter.

The slide 10 may be locked against rectilinear movement, so that its caliper element or jaw 10a is any desired number of units of measurement from a datum, by latching mechanism comprising a toothed slide 12 reciprocable between spaced slideways 13 and 14 fixed to the base 2. The reciprocation of the slide 12 may be conveniently effected through a stud 15 thereon which is engaged in a cam slot 16 of a lever 17 journalled on a boss 18 fixed to the base 2. The cam slot 16 has an offset portion 16' forming a seat into which the pin 15 snaps to hold the slide 12 in locking position as the lever 17 reaches the limit of its leftward movement (Figs. 4 and 5).

The front face of the caliper slide 10 contains a longitudinal groove 10' forming a keyway for a key 19 of a vernier caliper slide 20. A spring 22, coiled on the fixed stud 23, has one end engaging the housing wall and its other end bearing against a screw 24 on the slide 20 to shift the slide toward the left (Figs. 4 and 5) and bias the caliper element or jaw 20a thereon away from the caliper element or jaw 10a on the bar 10. A cam follower 20b fixed to the slide 20, rides on the periphery of a rotary spiral cam 25. The cam 25 is journalled on the boss 18 and has a hub 26 projecting through an aperture 27 in the detachable face plate 28 of the housing 1. A graduated dial 29 is fixed to the hub 26 by screws 30.

A covering and steading screw 30a having an enlarged head may be threaded into the stud 18.

The radii of the curve of the periphery of the cam 25 increase constantly by uniform increments and the maximum difference between the radii at the top and bottom of the step 25a of the cam 25 may be equal to but is preferably slightly in excess of the unit distance on which the slide 10 is calibrated and which represents a distance equal to a one-tooth shift of the slide 10 relatively to the slide housing 1 and slide 20. Instead of a continuous curve, the periphery of the cam may be cut, as shown in Fig. 6a, as a series of consecutive facets each normal to a radius of the cam and proportional in length to the calibrations 31 on the graduated dial 29.

The graduations 31 on the dial 29 and the curve of the helical periphery of the cam 25, or the facets equivalent thereto, are in decimal proportions to the unit distance between the centers of the teeth 11a, viz., the movement of the slide 20 resulting from the rotation of a hundred spaces of the dial 29 past a datum mark D on the face plate is equal to a one-tooth shift of the slide 10 relatively to the housing 1 and slide 20.

In using the gauge, the lever 17 is thrown to the right to unlatch the slide 12 from the slide 10 and the carriage formed by the housing 1 is slid to the left a distance sufficient to permit the insertion of the work W between the caliper elements 10a and 20a. By throwing the lever 17 to the left, the carriage may be latched to the rod 10 at such point that when the work W is engaged by the caliper element 10a, the distance between the work W and caliper element 20a is less than the center-to-center distance between adjacent teeth 11a. The dial 29 may then be turned by the pressure of the thumb or finger to move the caliper element 20a from its datum position toward the caliper element 10a until it contacts the work. Only a light pressure is required to turn the dial 29 since no movement of the long rod 20 or of the housing 1 is effected by turning the dial and the parts operable thereby are small and light. When the caliper element 20a contacts the work, the size of the latter may be read directly on the scales on the rod 10 and dial 29. Should it be desired to use the device as an internal gauge, caliper elements of suitable shape and scales suitably calibrated may, of course, be substituted for those shown.

The teeth of the rack 11 and slide 12 may be conveniently and economically cut as segments of matching screw threads on a lathe and most of the remaining parts may be made from sheet metal stampings.

Having described my invention, I claim:

1. In a micrometer gauge, the combination with a housing, a pair of cooperatively connected slides movable in said housing and having caliper elements connected therewith, means including a cam in said housing and rotatable about its axis for shifting one of said slides longitudinally of the other, and means comprising a slide movable transversely to said last named slide and a lever rocking about the axis of said cam for securing it in various positions relatively to said axis.

2. In a micrometric gauge, the combination with a base, a toothed member supported by said base having a caliper element spaced from said base, a latch complementary to the teeth of said member for securing said caliper element at predetermined distances from said base, a rocking member containing a seat for securing said latch in latching position, a slide having a caliper element movable between the base and caliper element first named, and means comprising a spring and a cam for moving said slide in opposite directions.

3. In a micrometer gauge, the combination with a base, a plurality of cooperatively connected slides supported by said base and each movable longitudinally with respect to the other and each having thereon a caliper element, of a cam rotatable about its axis for moving one of said slides, and means including a lever movable about said cam axis for preventing the movement of the other of said slides.

4. In a micrometer gauge, the combination with a base having ears extending laterally therefrom and forming, with said base, a slideway, said base having a rim bent transversely thereto and having spaced portions adjacent to said ears, a face plate complementary to said base and rim and forming therewith a housing, and caliper mechanism including a slide movable along said slideway.

5. In a micrometer gauge, the combination with a base, a caliper element supported by said base and having a bar connected therewith and a second caliper element having connected therewith a slide movable along said bar, of a cam movable along said bar and operatively positioned to move said slide along said bar in any position thereof, and means for fixing said cam relatively to said bar and comprising a rocking member and a sliding member having a pin and slot connection between them.

PAUL GLOUTON.